(12) United States Patent
Chou et al.

(10) Patent No.: US 11,098,841 B2
(45) Date of Patent: Aug. 24, 2021

(54) SUPPORT DEVICE FOR TIRE SEALANT INFLATOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 0 days.

(21) Appl. No.: 16/899,556

(22) Filed: Jun. 11, 2020

(65) Prior Publication Data

US 2020/0408354 A1    Dec. 31, 2020

(30) Foreign Application Priority Data

Jun. 26, 2019   (TW) ................. 108208230

(51) Int. Cl.
*F16M 11/22*   (2006.01)
(52) U.S. Cl.
CPC ....... *F16M 11/22* (2013.01); *F16M 2200/025* (2013.01); *F16M 2200/08* (2013.01)
(58) Field of Classification Search
CPC ............ F16M 11/22; F16M 2200/025; F16M 2200/08; B29C 73/166
USPC ...................................................... 248/127
See application file for complete search history.

(56) References Cited

U.S. PATENT DOCUMENTS

| | | | | |
|---|---|---|---|---|
| 8,978,716 | B2* | 3/2015 | Chou | B60S 5/043 |
| | | | | 141/38 |
| 9,027,608 | B2* | 5/2015 | Chou | B60C 29/064 |
| | | | | 141/38 |
| 9,168,798 | B2* | 10/2015 | Eckhardt | B60S 5/043 |
| 9,868,420 | B2* | 1/2018 | Chou | F04B 35/04 |
| 10,029,429 | B2* | 7/2018 | Eckhardt | B60C 29/064 |
| 2003/0047652 | A1* | 3/2003 | Eckhardt | B29C 73/166 |
| | | | | 248/121 |
| 2005/0274429 | A1* | 12/2005 | Laetgaard | B29C 73/166 |
| | | | | 141/38 |
| 2008/0145245 | A1* | 6/2008 | Chou | F04B 35/04 |
| | | | | 417/415 |
| 2010/0005930 | A1* | 1/2010 | Lolli | B29C 73/166 |
| | | | | 81/15.5 |
| 2013/0199665 | A1* | 8/2013 | Lolli | B29C 73/166 |
| | | | | 141/38 |
| 2018/0272631 | A1* | 9/2018 | Zaum | B29C 73/166 |
| 2019/0193349 | A1* | 6/2019 | Chou | B29C 73/166 |
| 2020/0376908 | A1* | 12/2020 | Chou | F16L 19/005 |
| 2020/0408354 | A1* | 12/2020 | Chou | F16M 11/22 |

* cited by examiner

*Primary Examiner* — Muhammad Ijaz (57) ABSTRACT

A support device for a tire sealant inflator contains: a C-shaped rib on which two spaced plates are engaged when inflating and supplying sealant into a broken tire, and the tire sealant inflator and the support device are connected so as to exert the tire sealant inflator stably. The support device further contains a base, and the base includes a C-shaped holder formed thereon, an opening defined on a side of the C-shaped holder, and the C-shaped rib extending inward from a top of the C-shaped holder.

3 Claims, 9 Drawing Sheets

SUPPORT DEVICE FOR TIRE SEALANT INFLATOR

FIELD OF THE INVENTION

The present invention relates to a support device for a tire sealant inflator which is configured to erect the tire sealant inflator on a ground stably and to store a sealant delivery hose.

BACKGROUND OF THE INVENTION

A conventional tire sealant supply device contains a box in which an air compressor is received, a tire sealant filler in which chemical sealant is accommodated, wherein the box is connected with an air nozzle of a broken tire via two delivery hoses. However, when feeding chemical sealant to the broken tire, the tire sealant filler slides or turns over easily because of vibration of the tire sealant supply device.

The present invention has arisen to mitigate and/or obviate the afore-described disadvantages.

SUMMARY OF THE INVENTION

The primary aspect of the present invention is to provide a support device for a tire sealant inflator which contains a C-shaped holder, an opening defined on a side of the C-shaped holder, a C-shaped rib extending inward from a top of the C-shaped holder, such that when inflating and supplying sealant into a broken tire, the two spaced plates are engaged with the C-shaped rib, and the tire sealant inflator is fixed on the support device securely and is erected on a ground stably.

Another aspect of the present invention is to provide a support device for a tire sealant inflator which stores a sealant delivery hose outside the tire sealant inflator easily.

DETAILED DESCRIPTION OF THE PREFERRED EMBODIMENTS

Figure 2:
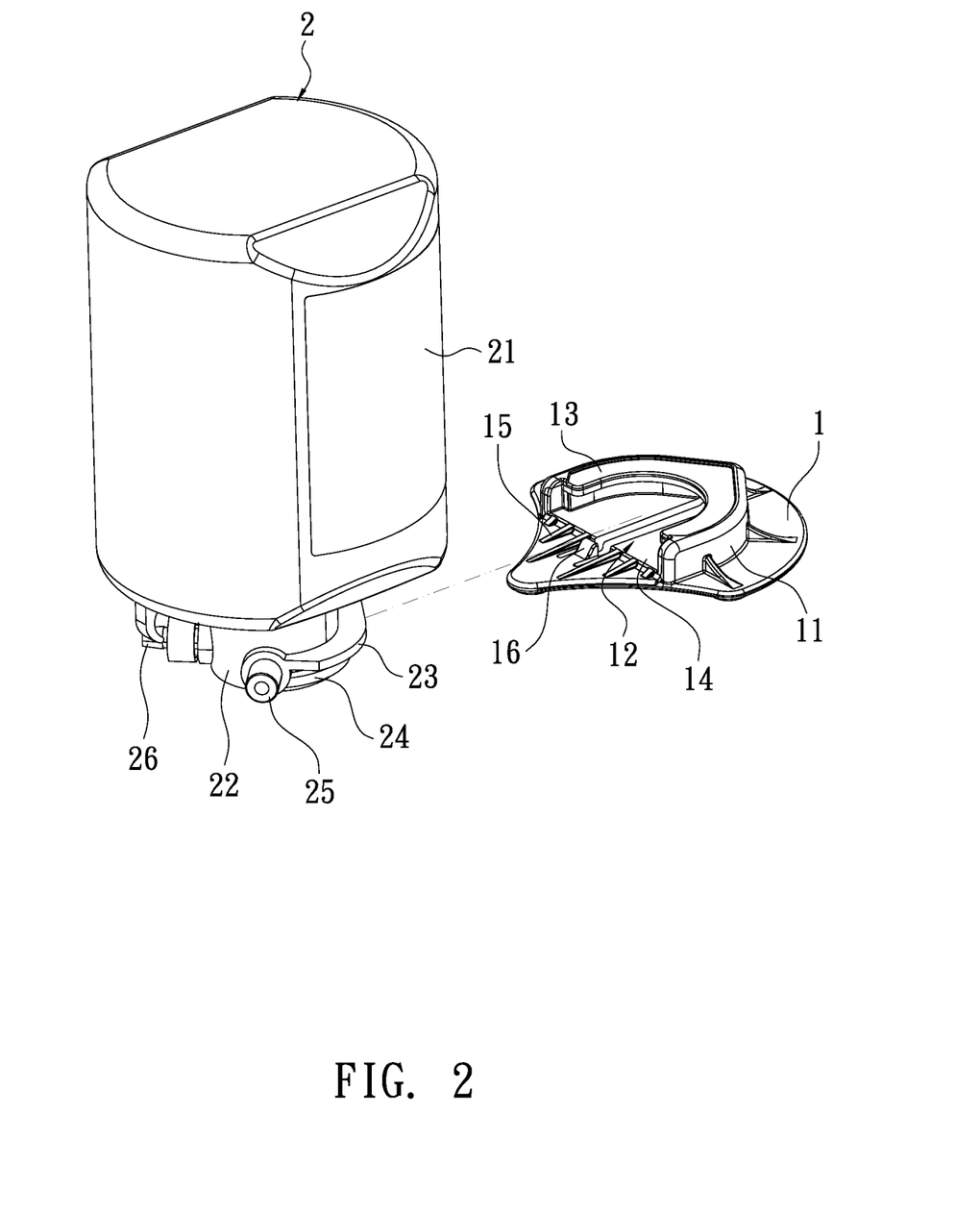
FIG. 2 is a perspective view showing the exploded components of the support device for the tire sealant inflator according to the preferred embodiment of the present invention.
Figure 3:
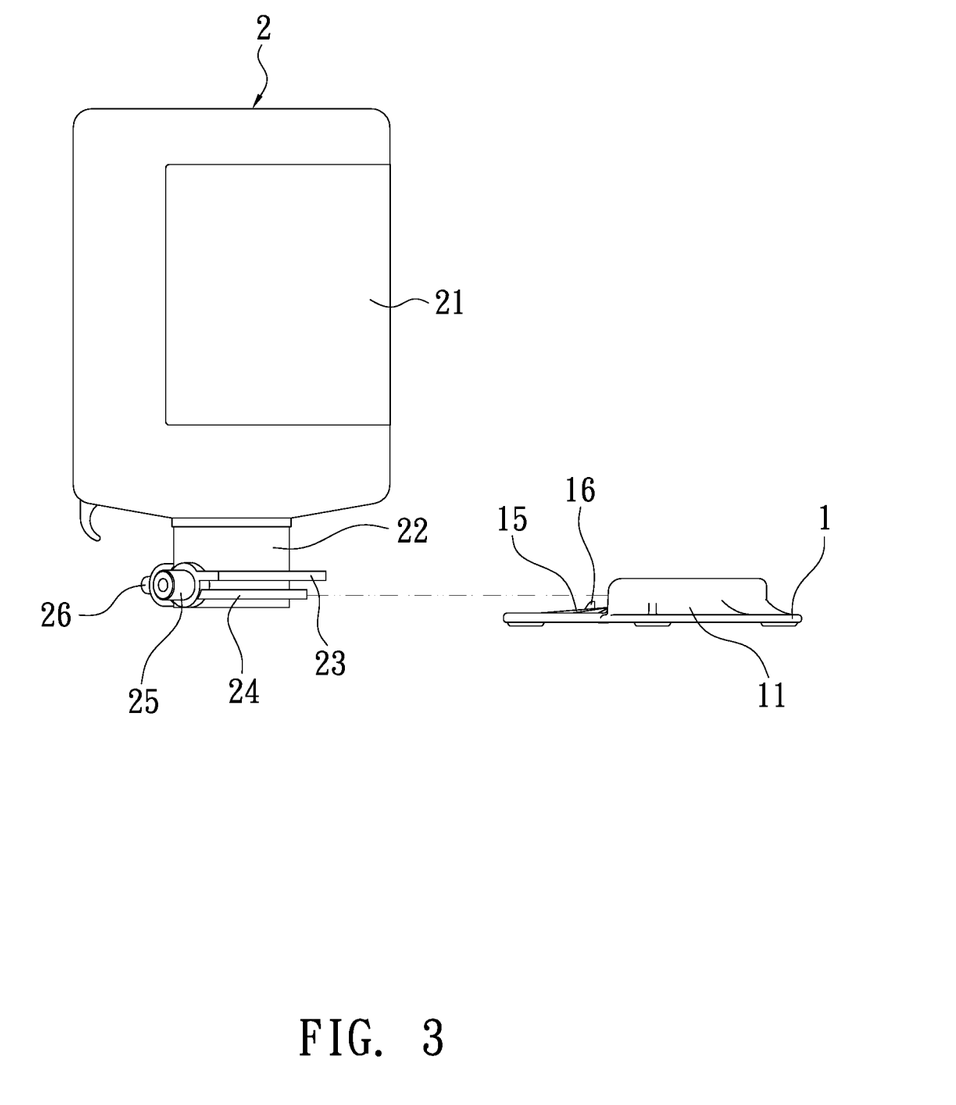
FIG. 3 is a side plan view showing the exploded components of the support device for the tire sealant inflator according to the preferred embodiment of the present invention.
Figure 4:
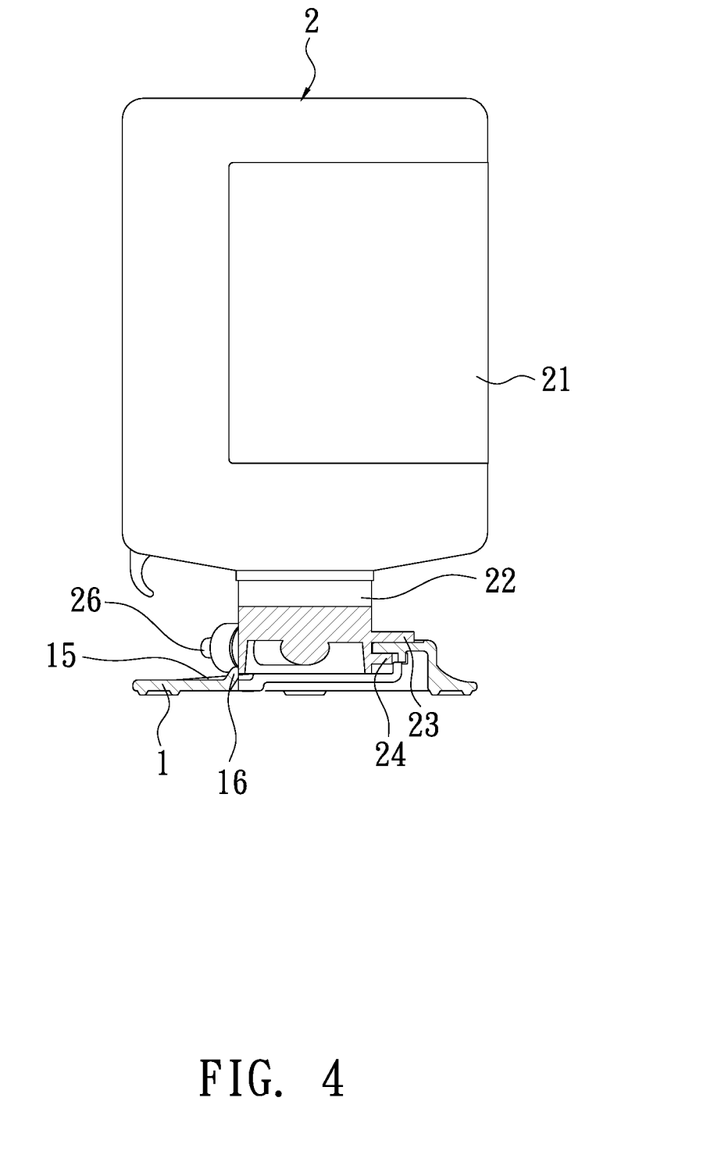
FIG. 4 is a cross sectional view showing the assembly of the support device for the tire sealant inflator according to the preferred embodiment of the present invention.

With reference to FIG. 2, a support device according to a preferred embodiment of the present invention comprises a base 1, and the base 1 includes a C-shaped holder 11 formed thereon, an opening 12 defined on a side of the C-shaped holder 11, a C-shaped rib 13 extending inward from a top of the C-shaped holder 11, a protruded platform 14 extending from the base 11 and defined inside the C-shaped holder 11 so as to formed a stepped portion between the opening 12 and the base 1, and at least one tilted projection 15 and a retainer 16 which are defined between the protruded platform 14 and the base 1, wherein the retainer 16 is configured to engage a tire sealant inflator 2 on the support device.

Figure 1:
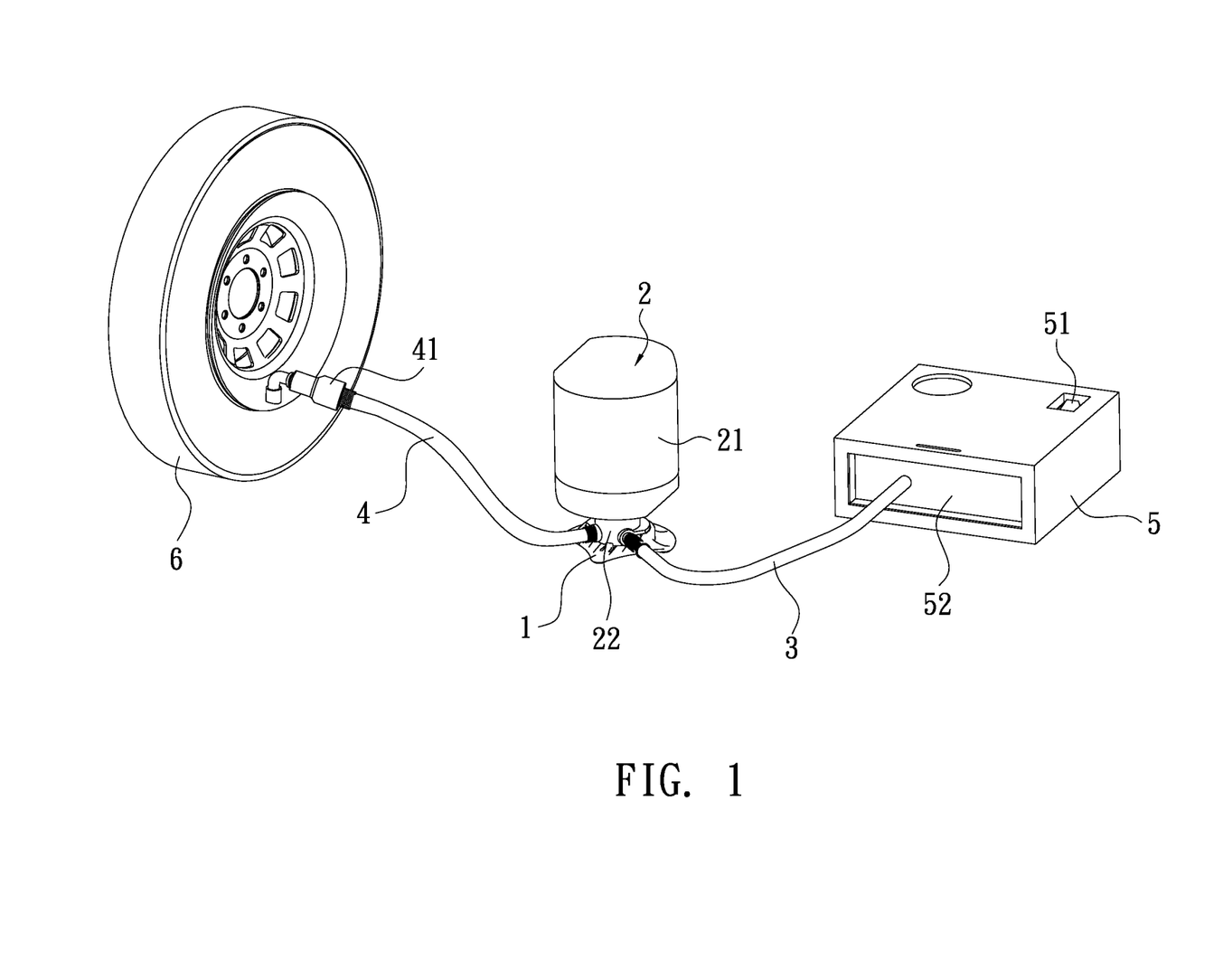
FIG. 1 is a perspective view showing the application of a support device for a tire sealant inflator according to a preferred embodiment of the present invention.

Referring to FIGS. 1-4, the tire sealant inflator 2 includes a can 21, a cap 22 screwed on the can 21, two spaced plate 23, 24 laterally extending from an outer wall of the cap 22 so that when inflating and supplying sealant into a broken tire, the tire sealant inflator 2 is engaged on the support device, for example, the two spaced plates 23, 24 are engaged with the C-shaped rib 13, and the retainer 16 abuts against the cap 22 of the tire sealant inflator 2, such that the tire sealant inflator 2 is fixed on the support device securely and is erected on a ground stably. After the tire sealant inflator 2 is fixed with the support device, an air delivery hose 3 is pulled out of an orifice 52 of a box 5 and is connected with an air inlet pipe 25 of the tire sealant inflator 2, a first end of a sealant delivery hose 4 is coupled with a sealant supply hose 26 of the tire sealant inflator 2, and a gas nozzle 41 on a second end of the sealant delivery hose 4 is fixed with a broken tire 6. When a switch 51 is turned on, compressed air is fed into the tire sealant inflator 2 via the air delivery hose 3 from an air compressor to urge tire sealant into the broken tire 6 via the sealant delivery hose 4, thus repairing and inflating the broken tire 6 safely, as shown in FIG. 1.

Figure 5:
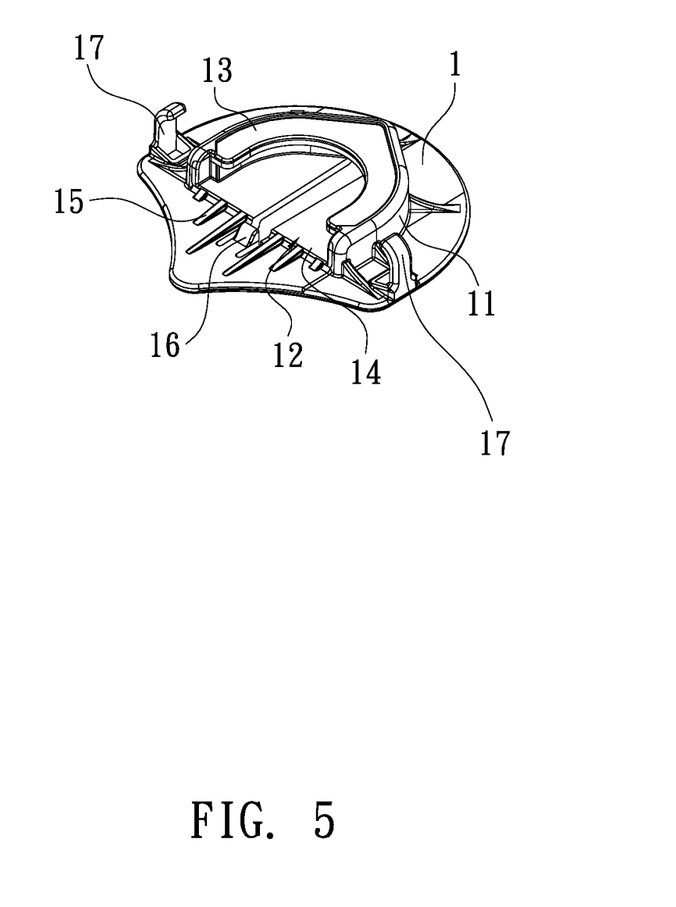
FIG. 5 is a perspective view showing the assembly of a support device for a tire sealant inflator according to another preferred embodiment of the present invention.
Figure 6:
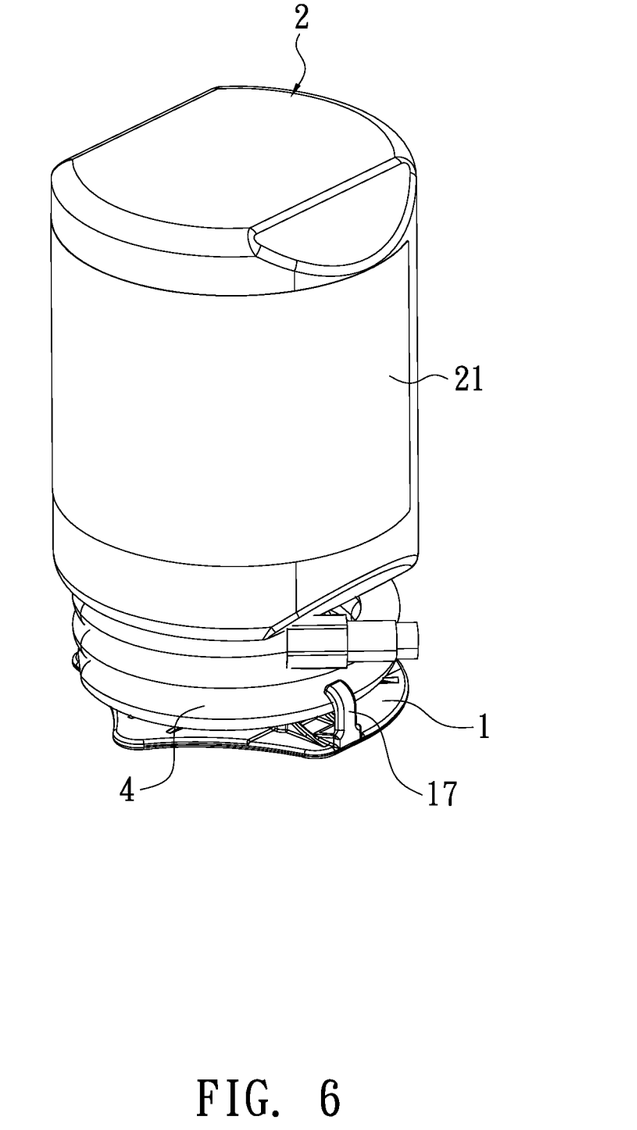
FIG. 6 is a perspective view showing the operation of the support device for the tire sealant inflator according to another preferred embodiment of the present invention.

As illustrated in FIGS. 5 and 6, in another embodiment, at least one hook 17 is arranged on the base 1 outside the C-shaped holder 11 so that when the tire sealant inflator 2 is not used, the sealant delivery hose 4 is stored outside the cap 22 of the tire sealant inflator 2 and is mounted by the at least one hook 17.

Figure 7:
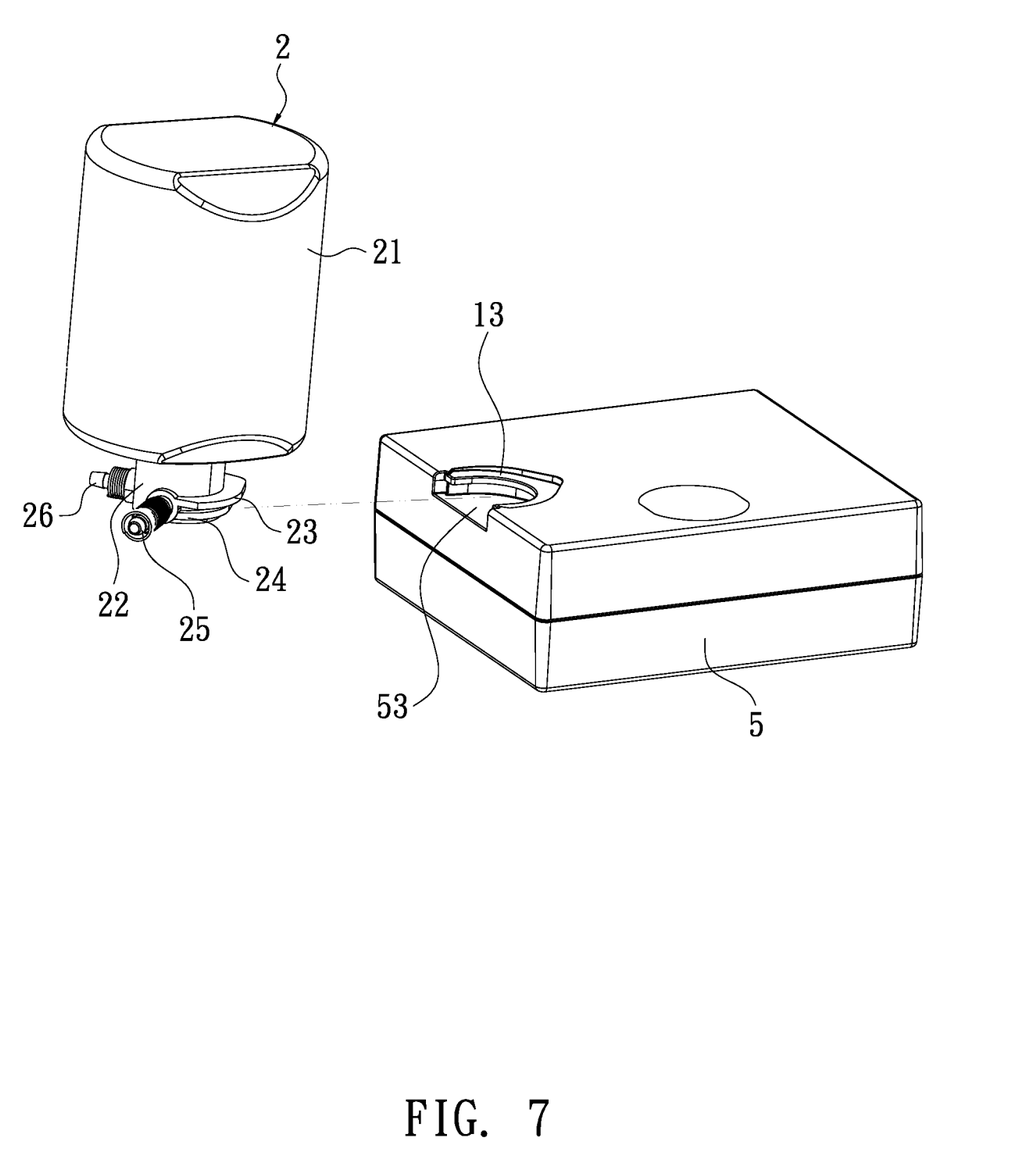
FIG. 7 is a perspective view showing the application of a support device for a tire sealant inflator according to another preferred embodiment of the present invention.
Figure 8:
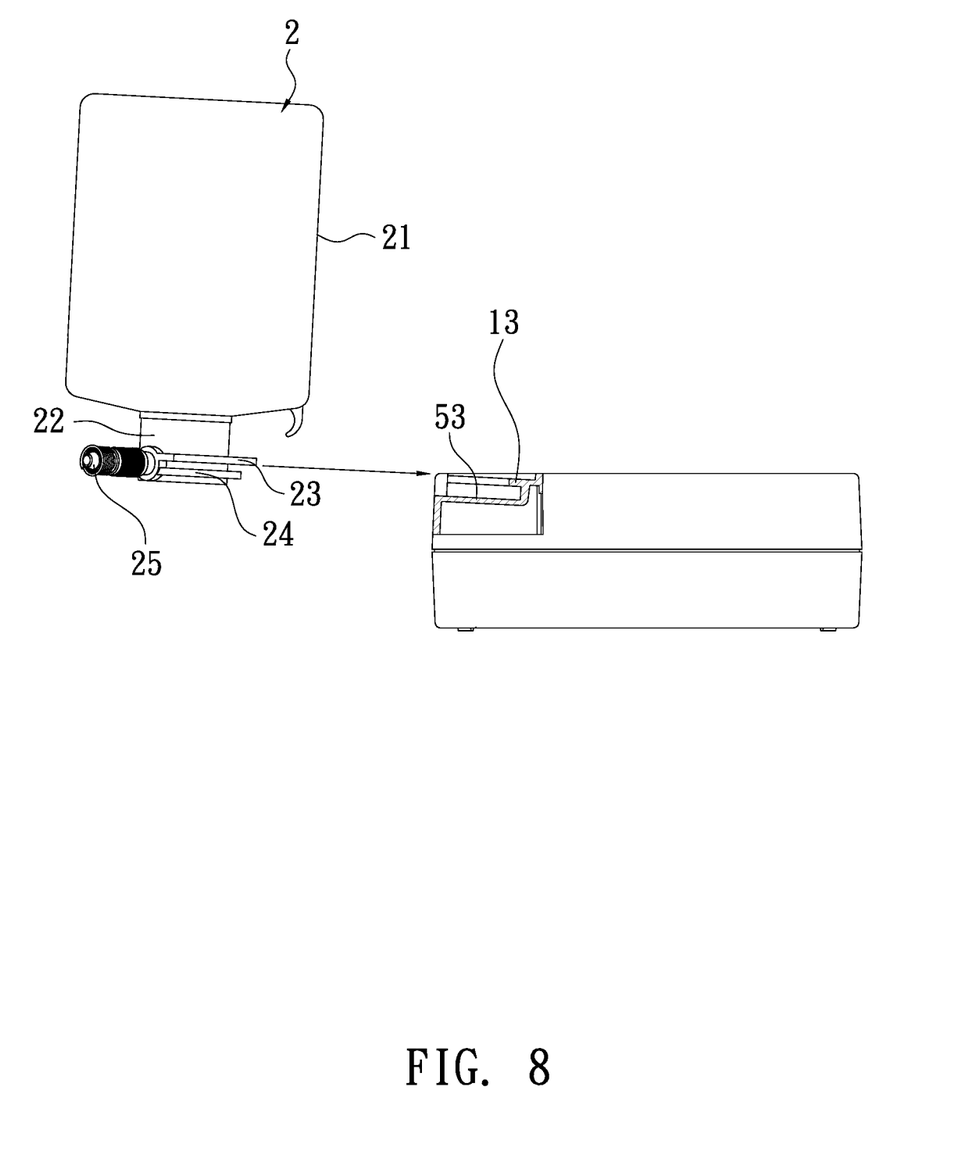
FIG. 8 is a side plan view of a part of FIG. 7.
Figure 9:
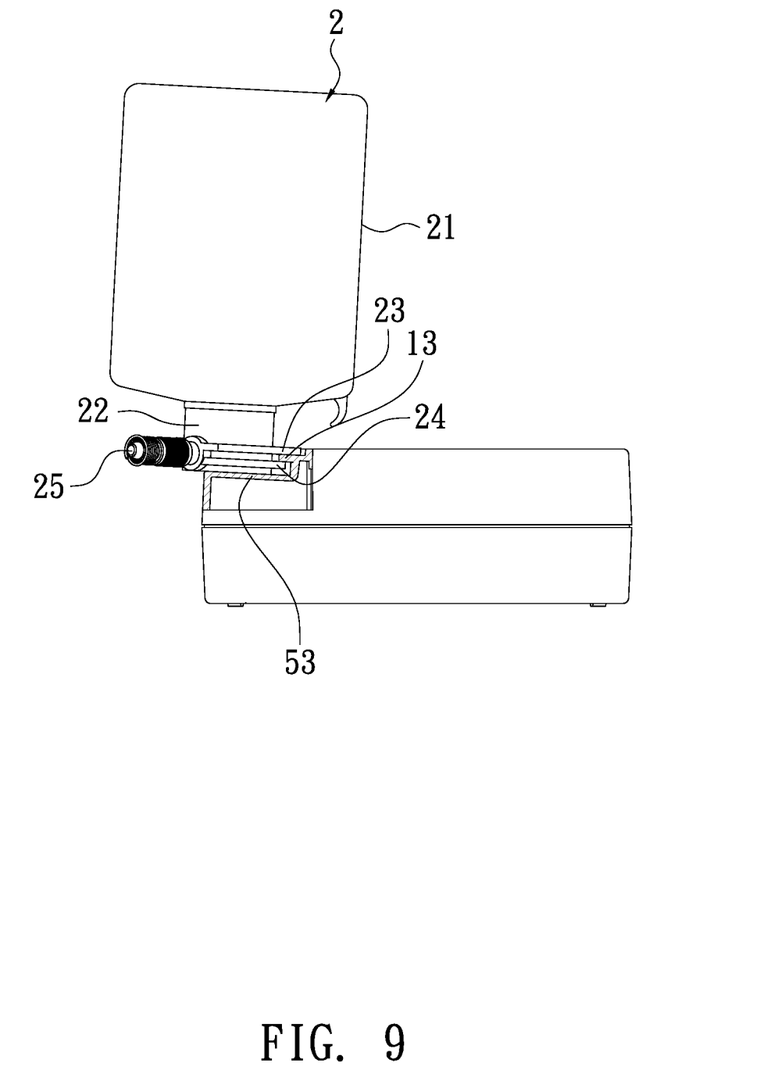
FIG. 9 is a cross sectional view of a part of FIG. 7.

With reference to FIGS. 7-9, in another embodiment, the support device for the tire sealant inflator 2 is fixed on the box 5, wherein the box 5 is configured to replace the base 1 of the first embodiment, and the box 5 includes a groove 53 defined on a side of a top thereof, wherein the groove 52 is inclined, and a C-shaped rib 13 is formed on the top of the box 5 around the groove 53, wherein the C-shaped rib 13 is inclined, and a slope of the C-shaped rib 13 is identical to a slope of the groove 53. When inflating and supplying the tire sealant, the two spaced plates 23, 24 of the cap 22 of the tire sealant inflator 2 are engaged with the C-shaped rib 13 of the support device, as illustrated in FIG. 9, and the tire sealant inflator 2 and the box 5 tilt to a center of the box 5, thus avoiding a removal of the tire sealant inflator 2 from the box 5 because of vibration of the air compressor.

Accordingly, the support device for the tire sealant inflator includes the C-shaped holder 11, the opening 12 defined on the side of the C-shaped holder 11, and the C-shaped rib 13 extending inward from the top of the C-shaped holder 11. When inflating and supplying the tire sealant, the two spaced plates 23, 24 of the cap 22 of the tire sealant inflator 2 are engaged with the C-shaped rib 13 of the support device, and the tire sealant inflator 2 and the support device are connected so as to erect the tire sealant inflator 2 on the ground stably. When the switch 51 is turned on, the compressed air is fed into the tire sealant inflator 2 via the air delivery hose 3 from the air compressor to urge the tire sealant into the broken tire 6 via the sealant delivery hose 4 which is connected with the sealant supply hose 26 of the tire sealant inflator 2, thus repairing and inflating the broken tire safely.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A support device for a tire sealant inflator comprising:
a base; and
a C-shaped rib disposed on the base and configured to engage two spaced plates on the tire sealant inflator when inflating and supplying sealant into a tire, the tire sealant inflator and the support device being connectable so as to support the tire sealant inflator;
wherein the base includes a C-shaped holder formed thereon, an opening defined on a side of the C-shaped holder, and the C-shaped rib extends inward from a top of the C-shaped holder;
wherein a protruded platform extends from the base and is defined inside the C-shaped holder so as to formed a stepped portion between the opening and the base, and at least one inclined projection is defined between the protruded platform and the base;
wherein the tire sealant inflator includes a can, a cap screwed on the can, and the two spaced plates laterally extend from an outer wall of the cap, a first end of a sealant delivery hose being couplable to a sealant supply hose of the tire sealant inflator; and
wherein at least one hook is arranged on the base outside the C-shaped holder so that when the tire sealant inflator is not used, the sealant delivery hose is storable outside the cap of the tire sealant inflator and is mountable by the at least one hook.

2. The support device as claimed in claim 1, wherein a retainer is defined between the protruded platform and the base, and the retainer is configured to engage the tire sealant inflator on the support device.

3. A support device for a tire sealant inflator comprising:
a C-shaped rib configured to engage two spaced plates on a tire sealant inflator when inflating and supplying sealant into a tire, the tire sealant inflator and the support device being connectable so as to support the tire sealant inflator;
wherein the support device is fixed on a box, and the box includes a groove defined on a side of a top thereof, wherein the groove is inclined, and the C-shaped rib is formed on the top of the box around the groove, wherein the C-shaped rib is inclined, and a slope of the C-shaped rib is identical to a slope of the groove;
wherein when inflating and supplying tire sealant, the two spaced plates of a cap of the tire sealant inflator are engageable with the C-shaped rib of the support device, and the incline of the groove and the C-shaped rib cause the tire sealant inflator to tilt to a center of the box.

* * * * *